United States Patent [19]

Evans

[11] Patent Number: 4,806,709
[45] Date of Patent: Feb. 21, 1989

[54] METHOD OF AND APPARATUS FOR SENSING THE LOCATION, SUCH AS COORDINATES, OF DESIGNATED POINTS ON AN ELECTRICALLY SENSITIVE TOUCH-SCREEN SURFACE

[75] Inventor: Blair Evans, Idlewild, Mich.

[73] Assignee: Microtouch Systems, Inc., Woburn, Mass.

[21] Appl. No.: 53,849

[22] Filed: May 26, 1987

[51] Int. Cl.[4] .............................................. G08C 21/00
[52] U.S. Cl. ...................................................... 178/19
[58] Field of Search ...................... 178/18, 19; 340/706, 340/712

[56] References Cited

U.S. PATENT DOCUMENTS

| 3,911,215 | 10/1975 | Hurst et al. | 178/18 |
| 4,198,539 | 4/1980 | Pepper, Jr. | 178/18 |
| 4,220,815 | 9/1980 | Gibson et al. | 178/18 |
| 4,233,522 | 11/1980 | Grummer et al. | 307/116 |
| 4,293,734 | 10/1981 | Pepper, Jr. | 178/18 |
| 4,353,552 | 10/1982 | Pepper, Jr. | 273/85 |
| 4,371,746 | 2/1983 | Pepper, Jr. | 178/18 |
| 4,680,429 | 7/1987 | Murdock et al. | 178/19 |

OTHER PUBLICATIONS

Interaction Systems, Inc., "The TK-1000 CRT Touch Development System Operators Manual", Newtonville, Mass., May 1983.
Sierracin/Intrex Products, "Transparent Electrically Conductive Film".
Sierracin/Intrex Products, "TransFlex:Unique Concepts in Membrane Switches, EMI Shielding and LCD Heaters".
Sun-Flex Co., Inc. "Touchpen On-Screen Digitizer", Novato, Calif.

Primary Examiner—Stafford D. Schreyer
Attorney, Agent, or Firm—Rines and Rines; Shapiro and Shapiro

[57] ABSTRACT

A method and apparatus are disclosed for determining the location of a designated point on an electrically sensitive touch-screen surface while minimizing aberrations introduced by non-uniformity in the field applied to the surface, by attaching a plurality of field-producing discrete point electrodes to widely spaced points on the surface in a predetermined geometric pattern and by measuring the currents drawn from the point electrodes upon the capacitive touching of a designated location on the surface.

36 Claims, 2 Drawing Sheets

METHOD OF AND APPARATUS FOR SENSING THE LOCATION, SUCH AS COORDINATES, OF DESIGNATED POINTS ON AN ELECTRICALLY SENSITIVE TOUCH-SCREEN SURFACE

The present invention relates to methods of and apparatus for sensing the location, such as coordinates, of designated points on an electrically sensitive touch-screen surface, such as capacitive touch-screen sensors and the like, being more particularly directed to reducing aberrations in linearity in the electrical sensing of locations over a large touch-screen surface, and to reducing cost of sensor manufacture.

Prior techniques for sensing discrete location on an electrically sensitive touch-screen surface include both resistive and capacitive methods. Resistive sensors generally have two surfaces, as of plastic and glass, at least one of which is deformable towards the other, with uniform or uniformly patterned coatings of a resistive material sandwiched therebetween. When pressure is applied to the flexible surface at a point, as by a stylus or finger, it deforms towards the opposing surface establishing contact between the opposing surfaces and thereby allowing sensing of the point of pressure. Such resistive sensors are described, for example in U.S. Pat. Nos. 3,911,215 and 4,220,815.

One disadvantage of the resistive screen sensor is the high cost of construction of the complex sandwich. Additional disadvantages include diminishing optical clarity when applied over a display device, such as a cathode ray tube. Finally, the durability of the resistive sensor is less than ideal in view of the susceptibility of the screen to cutting or scratching as with the nail of a finger or a sharp stylus, and because of fatigue problems in deformation.

Capacitive screens, on the other hand, generally minimize or ameliorate some of the aforementioned disadvantages of resistive screens. Such capacitive screen sensors usually require a single surface, such as glass, cloth or plastic, with a uniform resistive material coated or fused to one face of the surface, with the finger or a stylus establishing capacitive sensing when applied to the surface. Multiple electrodes are attached to the resistive material to render the screen electrically operative. Capacitive finger or stylus presence perturbs the electric field produced in the resistive material by the electrodes, enabling sensing so as to determine the position of the finger or stylus on the screen sensor. Among the numerous capacitive screen sensors that have been proposed is the arrangement described in U.S. Pat. No. 4,233,522, for example, which includes an array of touch-sensitive electrode switch cells, such as circular electrodes located on the screen surface. Touching the surface causes distortion of the electric field in the proximity of the nearest electrode, such distortion being greater than that near the other electrodes, thereby designating the nearest electrode as the area of the point of touching. Such a system inherently discretely divides the surface of the screen sensor into areas at least as large as the electrodes, preventing use for fine resolution. To obtain reasonable resolution, therefore, a large number of electrodes is needed, adding cost and complexity. Finally using electrodes on the sensing face of the screen sensor reduces the viewing clarity for underlying display screens.

Another type of electrode configuration for a capacitive screen sensor is that of Interaction Systems, Inc. (ISI), 24 Munroe Street, Newtonville, Mass., as described in their May, 1983, publication entitled "The TK-1000 CRT Touch Development System Operators Manual". This screen sensor has four linear bar electrodes, each extending approximately the entire length of one of the four sides of the rectangular screen sensor surface. Although solving the screen transparency problem inherent in previously mentioned circular electrodes, certain difficulties are inherent in the linear bar type of screen sensor. The vertical pair of opposing electrodes, if used in the absence of a horizontal pair, creates a regular horizontal electric field across the surface, enabling the touching of a point of the field to establish the exact distance from each vertical bar with simple computations, and therefore providing high resolution horizontal location sensing on the surface. The use of a second set of horizontally oriented linear electrodes, however, at the top and the bottom of the screen, creates a non-orthogonal electrical distortion in the horizontal electrical field in the regions along the horizontal bar electrodes, causing sensing aberrations due to the lack of a regular field near the electrodes. Such distortion, producing sensing aberration, usually is more severe at the corners where the orthogonal bar electrodes reach closest proximity to each other. Pre- or post-distortion circuiting is used to try to reduce the effects of tis aberration, but at additional complexity and not to the degree desired.

Modification of the solid bar electrode configuration has been proposed, including segmenting the bar electrodes into a plurality of successive sections along each edge of a surface, such as in the TransFlex TM screen produced by Sierracin/Intrax Products, 20500 Plummer Street, Chatsworth, Calif. 91311, and shown in their publications "Transparent Electrically Conductive Film" and "TransFlex TM Unique Concepts in Membrane Switches, EMI Shielding and LCD Heaters", and also in U.S. Pat. Nos. 4,293,734, 4,353,552 and 4,371,746. Such use of multiple closely spaced linearly arranged successive electrode sections is, however, subject to the same above-described attendant aberration disfunctions as the solid bar electrodes.

Curved bar electrode configurations have also been suggested which may also be used in conjunction with curvilinear patterns of successive electrode sections as described, for example, in U.S. Pat. No. 4,198,539. The curved bar electrode system, however, is also subject to the field distortion and resulting sensing aberration near the electrodes, including particularly the lack of corner resolution, as described for the linear bar electrodes.

The present invention obviates the above-described limitations and disadvantages of prior touch screens. The invention reduces the electrodes to just widely separated "points" or very small discrete regions and enables the use of a minimal number of such point electrodes at that. The widely spaced point or discrete electrodes are coupled to a uniform resistive surface, with each point electrode of sufficiently small surface area and located at such a remote distance from the other point electrodes, that a regular electric field may be produced over the complete screen surface, minimizing any possible field distortions produced by the electrodes thereon. Specifically, in a preferred or best mode, four point electrodes are employed, one at each corner or edge of the screen sensor surface, with each point electrode thus as far from any other point electrode as is physically possible. Multiple overlapping or partially overlapping geometric patterns of corner-located point electrodes can, if desired, be used to achieve optimum resolution near any particular area of the sensor, as will later be described in more detail. Additional point electrodes may also be placed for special effects along the side edges of the geometric patterns. The point electrodes, moreover, need not be located exclusively at edge or corner locations with respect to the sensor surface, but may be arranged in any geometric shape which maintains symmetry with the sensor shape, sufficient to produce a regular field over the entire sensor surface. Preferably a regular geometric shape using at least three discrete electrodes may be used to provide optimum location sensing with a minimum of distortion over the entire sensing surface. Additional discrete point electrodes may be used to provide greater resolution of sensing, especially in the area near one of the discrete electrodes where some measurement ambiguity may occur. Such flexibility in electrode placement provides a substantial advantage over previous capacitive touch-screen sensors in that the previous touch-screen sensors limited the sensing area to within the area bounded by the field-producing electrodes. The present invention does not require such limitation. Since a regular field is produced over the entire surface area of the screen sensor, and the discrete electrodes are not used to bound the regular field, due to the minimal field distortion around the discrete electrodes, location sensing can be successfully accomplished both within and without the area bounded by the discrete electrodes.

Additionally, the sensing apparatus of the invention compares the draw of alternating field current from each of the point electrodes, thus providing a wide dynamic range of capacitance that can be effectively sensed. This will also permit the use of dielectric material separating the uniform resistive coating on the screen sensor surface from the stylus or finger used to designate a desired point or location on the surface without significant loss of resolution or sensitivity.

It is accordingly an object of the present invention to provide a new and improved method of and apparatus for touch-screen sensing, providing reduction in aberration produced in the sensing of discrete locations on the screen surface, and that shall not be subject to the above-mentioned prior art limitations, but that, to the contrary, provide a simple, durable and inexpensive means for accurately sensing the discrete location of indicated points on the sensing surface.

A further object is to provide such a novel method and apparatus that have sufficient clarity and transparency of screen sensor surface to provide clear viewing through the screen sensor when mounted over a display surface.

A further object is to provide a novel method of and apparatus for capacitively sensing the location of a designated point on a sensor surface both inside and outside of the area bounded by the field-producing electrodes, where desired.

A still further object is to provide a novel method of and apparatus for providing an improved degree of sensing resolution in a capacitive touch-screen sensor.

An additional object is to provide a novel capacitive touch-screen sensor that is useful over a wide range of capacitance, automatically compensating for variations in touch impedance, and useful with intervening material between the sensor surface and the stylus, if desired, to designate location on the surface—all without substantial loss in resolution or sensitivity.

Other and further objects will be explained hereinafter and are more particularly delineated in the appended claims.

In summary, however, from one of its important aspects, the invention embraces a method of reducing the aberrations produced by irregular electric fields produced on touch-sensing surfaces and the like, that comprises, applying a plurality of discrete point electrodes to widely separated points of the surface in a predetermined geometric pattern, driving the point electrodes with a common alternating-current voltage to generate a regular electric field over the surface, and simultaneously measuring the currents drawn through the point electrodes upon the capacitive touching of a designated point on the surface to locate such designated point. Preferred details, best mode embodiments and other features are hereinafter described.

The invention will now be described with reference to the accompanying drawings:

FIG. 1 of which is a schematic block diagram of an illustrative type of capacitive touch-screen sensor showing a four and eight electrode configuration and position sensing between the electrodes;

Figure 1:
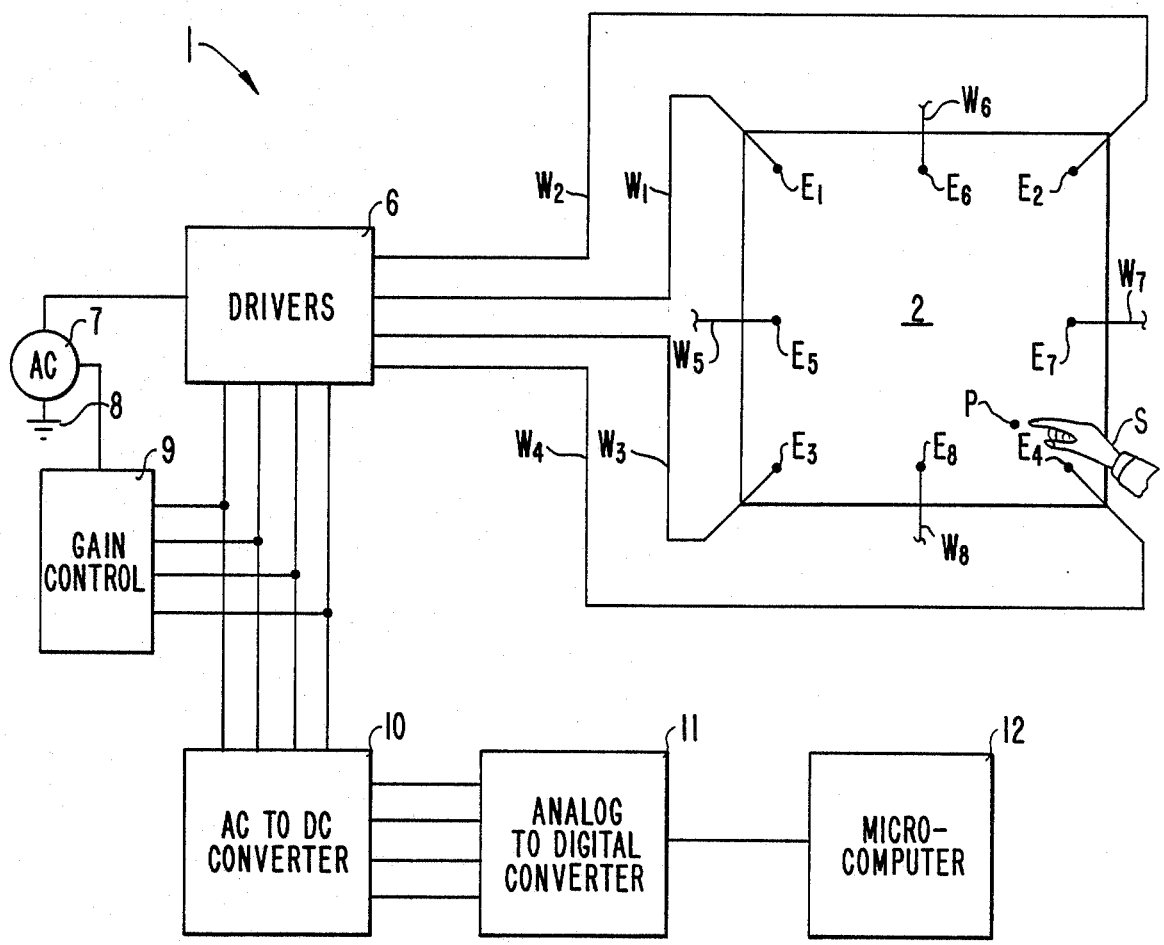
Figure 2:
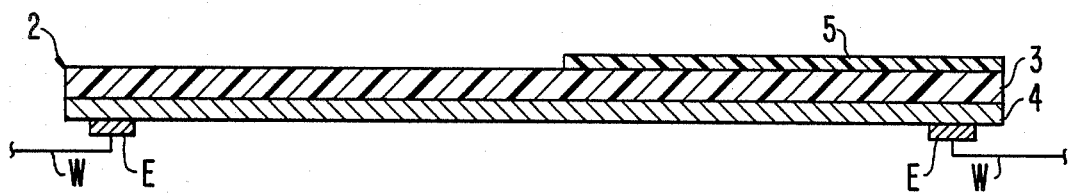
FIG. 2 is a longitudinal section of a capacitive touch-screen sensor partially covered by an intervening display material.

Referring to FIG. 1, a capacitive touch-screen sensor, generally designated 1, is provided with a screen 2 shown in longitudinal section in FIG. 2. The screen 2 is preferably made of a rigid transparent material, such as a plastic or glass sheet 3, FIG. 2, with a uniform coating of resistive material 4, such as a coating of Indium Tin Oxide (ITO), fused to the screen 2, of a sufficiently minimal thickness to provide transparent clarity through the coating 4. The coating 4 may be on either side of the sheet 3 but is preferably placed on the front (bottom surface of the sheet 3 in FIG. 2) to provide for maximum sensitivity to touch. The screen 2 may also be adapted with a partial or complete cover sheet 5, which can be made of dielectric material, such cover sheet 5 permitting fixed visual information on the screen 2 during use. Preferably, the cover sheet 5 is substantially transparent to allow viewing through both the cover sheet and the screen 2, and the cover sheet 5 is sufficiently thin to permit electrical capacitive touching contact between a stylus S, such as a finger, and the screen 2, as shown in FIG. 1.

Fixed in electrical contact to the resistive material coating 4 are a plurality of discrete electrodes E of predetermined size. The electrodes E should be of a sufficiently small size so as to minimize the area on the surface of screen 2 which is in close proximity to the electrodes and therefore subject to distortion, while being of sufficiently large size to minimize contact resistance with the coating 4. It has been found that a circular dot or "point" electrode with a diameter of between 0.031 and 0.250 inches is acceptable with a preference for a point electrode of 0.125 inches in cross-dimension or diameter. As the electrical distortion produced by the presence of the electrode exists substantially for only a few cross-sections or diameters from the electrode, such discrete point electrodes widely separated from each other—that is much more than a few diameters away on the surface—provide for a substantially distortion-free electrical field over the surface of the screen 2.

Each point electrode E is provided with an electrically conductive wire W, the wires being connected to a driver circuit for providing an electrical signal to each point electrode E which produces a regular electric field on the coating 4 of the screen 2 of the touch-screen sensor 1. More specifically, and in reference to FIG. 1, the screen 2 is provided with a first set of four point electrodes $E_1$-$E_4$, each connected by a conductive wire $W_1$-$W_4$ to a driver circuit or series of drivers 6, as will be discussed in more detail in reference to FIG. 3. The four point electrodes $E_1$-$E_4$ are positioned near the four corners of the square screen 2, having a regular square geometric form, and are widely separated from one another. The screen 2 is also provided with a second set of four discrete widely separated point electrodes $E_5$-$E_8$ each connected by a respective wire $W_5$-$W_8$ to a driver circuit in a manner similar to wires $W_1$-$W_4$, and also connected to drivers 6 as will be explained in more detail hereinafter.

Referring again to FIG. 1, the drivers 6 are electrically connected by four output wires $W_1$-$W_4$ to the respective point electrodes $E_1$-$E_4$ on the screen 2, as noted above, for driving the screen 2 to produce a regular electric field over the screen 2, and four output wires which drive the sensor measurement circuitry of the touch-screen sensor 1. More specifically, the drivers 6 are provided with an AC voltage $V_r$ from an AC source 7. The AC source 7 is electrically connected to the drivers 6, a ground 8 and a gain control circuit 9. The AC source 7 provides to the drivers 6 a high frequency sine wave of approximately 10-50 kilohertz and the drivers 6, in turn, drive each electrode $E_1$-$E_4$ on the screen 2 to a constant amplitude sine wave. The drivers 6 also provide a mechanism for measuring the current drawn through the electrodes $E_1$-$E_4$, so if all the electrodes $E_1$-$E_4$ are driven at the same voltage, the output from each of the drivers will be the different currents that correspond to the voltages of the electrodes $E_1$-$E_4$. These current-draw signals go to two paths. One path is a gain control block 9 which takes those four measurement signals, feeds them back through any conventional computational circuit (which is shown as part of gain control block 9) which causes the reference voltage supplied from the AC source 7 to increase or decrease in magnitude sufficient to keep the four point electrode currents within some predetermined range. In the second path, the signals are transferred to an analog-to-digital (AC/DC) converter block 10 which takes the 10-50 kHz sine wave, converts it to a DC voltage corresponding to its amplitude and from there through a computational circuit and an analog-to-digital converter (ADC) 11 and to a microcomputer 12 to compute and determine actual coordinates of a point P designated by capacitive touching of the stylus S on the screen 2. Coordinates are obtained by measuring the signals representing current drawn through each electrode $E_1$-$E_4$, such signals being directly dependent upon the distance from each electrode $E_1$-$E_4$ to the capacitively touched point P, in a manner later described in more detail.

Figure 3:
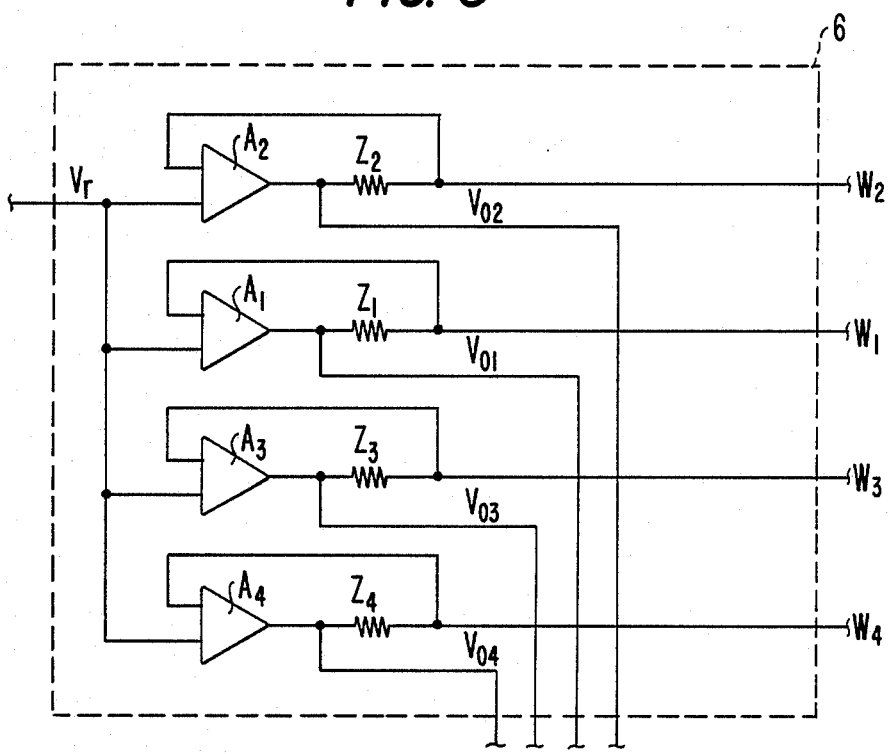
FIG. 3 is a schematic diagram of the discrete electrode drivers of the four-electrode configuration illustrated in FIG. 1.

Referring now to FIG. 3, which is a schematic diagram of the drivers 6, such are provided with a reference voltage $V_r$ supplied from the AC source 7, as shown in FIG. 1. Each driver in this implementation is in effect an operational amplifier (op.amp.) $A_1$-$A_4$ with some respective impedance $Z_1$-$Z_4$, such as provided by matched resistors on its output terminal, and a feedback arrangement. The feedback arrangement maintains the voltage driving the electrodes $E_1$-$E_4$. The difference between the voltages at the output of the op.amps. $A_1$-$A_4$, designated as respective voltages $V_{01}$-$V_{04}$, and the input voltage $V_r$ is the same as the voltage across the corresponding impedances $Z_1$-$Z_4$, giving an indication of the current drawn by each electrode $E_1$-$E_4$. That voltage $V_{01}$-$V_{04}$ is passed to the gain control block 9 and shown in FIG. 1.

The quantity of interest for determination of location is the voltage $V_n = V_n - V_r$, where $V_{0n}$ represents the voltages $V_{01}$-$V_{04}$, and $V_r$ is the reference voltage already discussed. Additionally, $V_n = K \; 1/R_n$ where $R_n = f(D_n)$ with $R_n$ being the impedance between the electrode $E_n$ and the touch point P; $D_n$, the distance from electrode $E_n$ to the touch point P; K, a proportionality factor that, although variable, is common to all outputs; and $f(D_n)$ referring to a simple function of the touch screen, such as an x, y coordinate axis function. Therefore, the voltage $V_n$ is proportional to the reciprocal of the resistance between the electrode $E_n$ and the touch point P. Since the proportionality constant is determined by the impedances $Z_1$-$Z_4$, the impedances $Z_1$-$Z_4$ and therefore the corresponding drivers 6 must be matched, and the quality of the coupling between the screen 2 and ground must be equal for each of the drivers 6 since they have a common touch point P on the screen 2. The voltage measured for each electrode $E_1$-$E_4$, therefore, is proportional to the reciprocal of the total impedance, and the impedance is a simple function of the distance from each electrode $E_1$-$E_4$ to the touch point P.

To provide for a wide dynamic range of touch capacitance that can be used to determine location of a designated point P on the screen 2, the gain control block 9 maintains the largest of the measured voltages to within a predetermined percentage of the full scale signal for the AC to DC converter 10. This allows the capacitive touching, for sensing between the screen 2 and ground to the finger or other stylus S, to vary by at least three orders of magnitude. More specifically, if a finger of a human hand is used as the stylus S, because of the variables including the size of the person, moisture content of the skin and quality of the touching between the touch screen 2 and ground to the finger, the touch capacitance is very variable. Also, the finger (stylus) may inject voltage into the screen 2 causing signal distortion. The simultaneous reading and driving of the electrodes removes the sensing difficulties inherent in such problems and also minimizes extraneous electronic noise on the system, since only electrical comparisons between electrode signals are made, and such common noise will be minimized. To limit the range of AC-to-DC conversion, a voltage sum technique is therefore used.

Under such a technique, the voltages $V_{0n}$ are summed and kept within a preselected range. Since the voltages $V_{0n}$ are proportional to shared currents, as described previously, the maximum differences would be one, if an electrode E were being touched (one current would be maximum, while the others are zero). The opposite case would be the center point of screen 2, equidistant from all electrodes $E_1$-$E_4$. It is important to note that only the differences and ratios thereof between the different currents drawn through the electrodes $E_1$-$E_4$ is utilized. The actual magnitude of the currents is not of importance in determining point P location. Thus a wide dynamic range of electrical characteristics, specifically capacitance, can be sensed and the system will automatically compensate for variations in touch impedance. By using a gain control circuit, such automatic compensation may actually be accomplished before the current drawn through the electrodes $E_1$-$E_4$ is measured.

Figure 4:
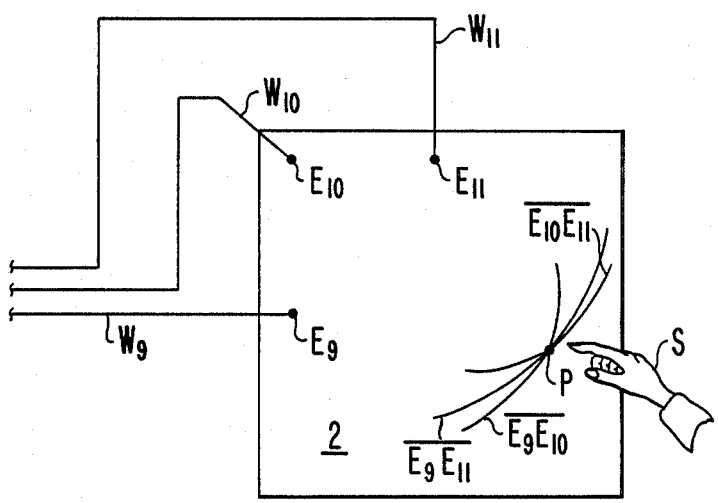
FIG. 4 is a three-electrode configuration, similar to FIG. 1, showing position sensing beyond the boundaries bordered by the electrodes.

Referring now to FIG. 4, a screen 2 is shown with a three-electrode $E_9$-$E_{11}$ configuration, being the minimum number of electrodes for sensing two-dimensional coordinates on the surface of screen 2, forming the corner boundaries of a triangular geometric pattern. Each electrode $E_9$-$E_{11}$ is connected by a corresponding wire $W_9$-$W_{11}$ to drivers in a manner similar to that described for FIG. 1. FIG. 4 also has a designated point P, designated by capacitive touching with a stylus S, such as a finger, to the designated point P on the screen 2.

As a graphical example of how location of a designated point P is sensed, and in reference to FIG. 4, a comparison or ratio of currents between the electrodes is established. Specifically, there is a locus of points, at least partially on the screen 2, that when capacitively touched will produce the same ratio of current drawn through any two specific electrodes E. As an example, the locus of points having a single current draw ratio between electrodes $E_9$ and $E_{10}$ has a curvilinear segment $E_9E_{10}$ that passes through the designated point P. In a similar manner, the ratios between electrodes $E_{10}$ and $E_{11}$ and $E_9$ and $E_{11}$ have curvilinear segments $E_{10}E_{11}$ and $E_9E_{11}$, respectively, each constrained to pass through the designated point P. Each of the three curvilinear segments $E_9E_{10}$, $E_{10}E_{11}$ and $E_9E_{11}$ share only one common point of intersection, that point being the designated point P. As shown, the designated point P may be located, even outside of the triangular geometric pattern bounded by the electrodes $E_9$-$E_{11}$. Additional point electrodes E, not shown on FIG. 4, would provide additional or redundant curvilinear segments and such additional electrodes would especially be useful when the designated point P is near an area of measurement ambiguity. In such a situation, the other electrodes, not being subject to the same measurement ambiguity, would be used in the above-described manner to resolve and locate the designated point P. Such an additional or redundant discrete electrode configuration is shown in FIG. 1.

FIG. 1, as before mentioned, shows a four-electrode $E_1$-$E_4$ configuration connected to drivers 6 and a second four electrode $E_5$-$E_8$ configuration connected to drivers. Such a system can be used in at least two modes. The first provides two independent four electrode E configurations that are alternately scanned; that is, the drivers 6 drive the electrodes $E_1$-$E_4$ and, after the location of point P is determined but before the designated point P has changed, the same drivers 6 would drive electrodes $E_5$-$E_8$ in a partially overlapping interior surface arrangement. It should be noted that the point P is located within the square geometric pattern bounded by electrodes $E_1$-$E_4$ and outside of the square geometric pattern bounded by electrodes $E_5$-$E_8$. In both cases, whether inside or outside the square geometric pattern bounded by the electrodes $E_1$-$E_4$ or $E_5$-$E_8$, the designated point P can be sensed and located by the capacitive touch-screen sensor 1. Using the two partially overlapping square geometric patterns provides for redundant error checking for enhanced resolution. For example, if the designated point P were near a measurement ambiguity, the other three electrodes $E_1$-$E_3$ are sufficient accurately to determine the location of point P. However, the additional pattern of electrodes $E_5$-$E_8$ provides a high resolution check, as none of the electrodes $E_5$-$E_8$ is close enough to point P to provide resolution distortion. Therefore, in this method of operation, the drivers 6 would alternately drive each pattern of electrodes $E_1$-$E_4$ and $E_5$-$E_8$ to provide high resolution, low error sensing of point P.

The second mode of operation provides that all eight electrodes be driven simultaneously, which would require another set of drivers (not shown), similar to drivers 6, to be connected to the electrodes $E_5$-$E_8$. Since eight electrodes $E_1$-$E_8$ provide for a substantial number of intersecting curvilinear segments, as previously described, a high degree of resolution of sensing is provided.

Other modes are contemplated such that any geometric pattern bounded by three or more electrodes E may be driven simultaneously and may be driven alternately with any other pattern of three or more electrodes E. Such geometric patterns of electrodes E may be regular or irregular, overlapping or not overlapping, and in each case such a pattern of point electrodes will locate a designated point P, whether within or without such geometric patterns, on the screen surface 2. Care should be taken to minimize the number of electrodes E and widely separate them such that minimal inter-electrode distortion results.

Mathematically, the four electrode square configuration shown in FIG. 1 can also be defined. The sensor impedance $R_n$ between the electrode $E_n$ and the touch point P is a function of the distance $D_n$ between the electrode $E_n$ and the touch point P, $R_n = f(D_n)$. Said function, $f(D_n)$, is predetermined by sensor screen construction and the geometry of the electrodes E. The voltages that come out of the drivers $V_n$, which has been previously defined as $V_{0n} - V_r$, are proportional to the reciprocal of the sensor impedance $R_n$, $V_n = K/R_n$. The distance $D_n$ may therefore be related to the driver voltage $V_n$: $V_n = 1/f(D_n)$ or $D_n = f^{-1}(1/V_n)$. Since the ratio between the distances from any two electrodes E is a measured value, the location f the designated point P becomes a basic distance formula on the distances $D_n$. A, B, C and D are the square of the distances that are represented by the voltages that come out of the driver 6. Electrodes A to D = $1/V_n^2$ where $$A = 1/V_1^2 \quad C = 1/V_3^2$$
$$B = 1/V_2^2 \quad D = 1/V_4^2$$

in reference to voltages for each of the electrodes E, where A is the voltage of $E_2$, B is the voltage of $E_3$, C is the voltage of $E_4$ and D is the voltage $E_1$.

Therefore the distance from each of the four electrodes $E_1$-$E_4$ to the designated touch point P, in terms of the four measurements defined above are:

$$(1-X)^2 + (1-Y)^2 = A(1/K);$$
$$(1-X)^2 + (1+Y)^2 = B(1/K);$$
$$(1+X)^2 + (1-Y)^2 = C(1/K); \text{ and}$$

$$(1+X)^2+(1+Y)^2=D(1/K);$$

where K is the previously defined proportionality factor and X and Y refer to coordinates on an x,y coordinate axis planar surface. Since the sum of opposite diagonals of a rectangle are constant $$A+C=B+D.$$

Now define the quantities S and T as follows:

$$S = \frac{A+B+C+D}{4}, T = X^2 + Y^2 + 2,$$

so T=KS. Therefore, $$\frac{X+Y}{T} = \tfrac{1}{2}(C/S - 1) = \tfrac{1}{2}(1 - A/S) = L$$

and $$\frac{X-Y}{T} = \tfrac{1}{2}(D/S - 1) = \tfrac{1}{2}(1 - B/S) = M.$$

Also, $L^2+M^2=P^2$; so $P^2T^2-2T+4=0$. This, defining a quadratic equation, becomes;

$$\frac{1}{T} = \frac{1 + \sqrt{1 - 4P^2}}{4},$$

where the solution limits result in:

$$\frac{-1}{2} \leq L; \frac{1}{2} \geq M; \frac{1}{4} \geq P^2; \text{ and } 2 \leq T \leq 4.$$

Given the four measured quantities, A, B, C, and D, and solving for 1/T, both the coordinates X and Y can be solved for, based on definitions of:

$$X = T\frac{(L+M)}{2} \text{ and } Y = T\frac{(L-M)}{2},$$

allowing for simple and rapid solutions of X and Y coordinates of a designated point P on a screen 2 as will be accomplished by the microcomputer 12 of the capacitive touch-screen sensor 1. Similar mathematics can be used for differing numbers of electrodes E and for different geometric patterns of electrodes E.

Additionally, it is contemplated that a more sophisticated stylus S may be used, rather than a human finger. Such a stylus may include a grounded impedance with substantially higher capacitance than a human body or other objects that might inadvertently touch the screen 2. Defining a capacitive threshold above that of a person and below the capacitance of the low impedance stylus would allow a user to rest his/her hand on the screen 2 without designating a point, and using the high impedance stylus to designate the desired point P.

While the invention has been described with reference to a particular preferred embodiment, further modifications will occur to those skilled in this art, which are considered to fall within the spirit and scope of the invention as defined in the appended claims.

What is claimed is:

1. A capacitive touch-screen sensor apparatus for providing high resolution sensing of a designated point on a touch-screen surface having, in combination:
   a rigid uniformly electrically conductive surface;
   a plurality of discrete point electrodes widely separate from one another on the surface;
   alternating current driver means connected to the point electrodes for driving the electrodes with matched drive signals to produce a regular electric field over the surface;
   first circuit means for separately sensing the respective currents drawn through the point electrodes in response to the capacitive touching of a designated point on the surface and producing in accordance with each sensed current a signal representing the distance from the designated point to the corresponding electrode; and
   second circuit means for determining from the distance-representing signals the location of the designated point on the surface.

2. A sensor apparatus as claimed in claim 1 and in which the designated point is capacitively touched by a stylus including the human finger.

3. A sensor apparatus as claimed in claim 2 and in which a dielectric layer is provided between the rigid uniformly electrically conductive surface and the stylus.

4. A sensor apparatus as claimed in claim 3 and in which the dielectric layer is fused to the conductive surface.

5. A sensor apparatus as claimed in claim 2 and in which the stylus has an impedance substantially lower than non-point designating screen-touching objects.

6. A sensor apparatus as claimed in claim 1 and in which the point electrodes have a diameter between about 0.031 and 0.250 inches.

7. A sensor apparatus as claimed in claim 6 and in which the point electrodes have a diameter of approximately 0.125 inches.

8. A sensor apparatus as claimed in claim 1 and in which the surface is rectangular.

9. A sensor apparatus as claimed in claim 8 and in which four discrete point electrodes are on the surface.

10. A sensor apparatus as claimed in claim 9 and in which each electrode is adjacent a corner of the surface.

11. A sensor apparatus as claimed in claim 9 and in which each electrode is adjacent the midpoint of an edge of the surface.

12. A sensor apparatus as claimed in claim 1 and in which the driver means is supplied with a single alternating current.

13. A sensor apparatus as claimed in claim 12 and in which the driver means includes a plurality of alternating-current drivers each connected to a corresponding one of the point electrodes, and wherein the drivers have matched impedances to provide equal voltages to the point electrodes.

14. A sensor apparatus as claimed in claim 1 and in which the electrically conductive surface is essentially transparent to provide optical clarity through the sensor when applied over a display device.

15. A sensor apparatus as claimed in claim 1 and in which the first circuit means senses the respective electrode currents simultaneously.

16. A sensor apparatus as claimed in claim 1 and in which the electrodes define the boundaries of a regular geometric pattern.

17. A sensor apparatus as claimed in claim 16 and in which the electrodes define the boundaries of two at least partially overlapping regular geometric patterns.

18. A sensor apparatus as claimed in claim 17 and in which the first circuit means senses the electrode currents for each electrode pattern in turn.

19. A sensor apparatus as claimed in claim 18, and in which the first circuit means simultaneously separately senses the respective electrode currents in each pattern.

20. A method of touch location, comprising providing a touch-sensing surface having a plurality of discrete point electrodes widely spaced apart thereon in a predetermined geometric pattern, driving the electrodes with matched alternating-current voltages to generate a regular electric field over the touch-sensing surface, separately measuring the respective currents through the point electrodes simultaneously upon a capacitive touching of the touch-sensing surface, and determining the location of the capacitive touching from the measured currents.

21. The method of claim 20, wherein the electrodes define the boundaries of a regular geometric pattern.

22. The method of claim 21, wherein the electrodes define the boundaries of more than a single regular geometric pattern.

23. The method of claim 22, wherein the measuring step is conducted in turn for each geometric pattern of electrodes.

24. The method of claim 23, wherein two or more of the electrode patterns partially overlap.

25. The method of claim 20, wherein the electrodes are spaced apart sufficiently from each other to minimize signal distortion therebetween.

26. The method of claim 25, wherein the electrodes are located near the periphery of the touch-sensing surface.

27. The method of claim 20, wherein a signal representing the distance between the location of the capacitive touching and each electrode is produced in accordance with the measured current flow through that electrode, and wherein the respective distance-representing signals are processed to obtain the location of the capacitive touching on the touch-sensing surface.

28. A method of touch location, comprising providing a touch-sensing surface having a plurality of discrete point electrodes widely spaced apart thereon and defining the boundaries of a regular geometric pattern, driving the electrodes with matched alternating-current drive voltages to produce a regular electric field over the touch-sensing surface, producing in accordance with the respective current flow in each electrode a signal representing the distance from a capacitively touched point on the touch-sensing surface to that electrode, and determining the location of the touched point on the touch-sensing surface from the distance-representing signals.

29. The method of claim 28, wherein the producing step includes separately measuring the respective electrode current flows simultaneously.

30. The method of claim 29, wherein the electrodes define the boundaries of a plurality of regular geometric patterns, and wherein the measuring step is conducted in turn for each pattern of electrodes.

31. The method of claim 28, wherein the touched point is within the boundaries of the geometric pattern defined by the electrodes.

32. The method of claim 28, wherein the touched point is outside the geometric pattern defined by the electrodes.

33. The method of claim 28, wherein automatic compensation is effected for variations in touch impedance.

34. Capacitive touch-screen sensor apparatus, comprising:
   a electrically conductive touch-sensitive surface;
   a plurality of discrete point electrodes widely space from one another on the surface;
   alternating current driver means connected to the point electrodes for driving the electrodes with matched drive signals to produce a regular electric field over the touch-sensitive surface;
   first circuit means for separately sensing the respective currents drawn through the point electrodes in response to the capacitive touching of a designated point on the touch-sensitive surface; and
   second circuit means for determining from the separately sensed currents the location of the designated point on the touch-sensitive surface.

35. Sensor apparatus as claimed in claim 34 and in which the first circuit means senses the respective electrode currents simultaneously.

36. Sensor apparatus as claimed in claim 34, and in which the electrodes define the boundaries of a regular geometric pattern.

* * * * *